Dec. 17, 1968   E. A. WEIDENMILLER   3,416,466
ROTARY COOKIE DIE ROLLS
Filed Aug. 19, 1966   2 Sheets-Sheet 1
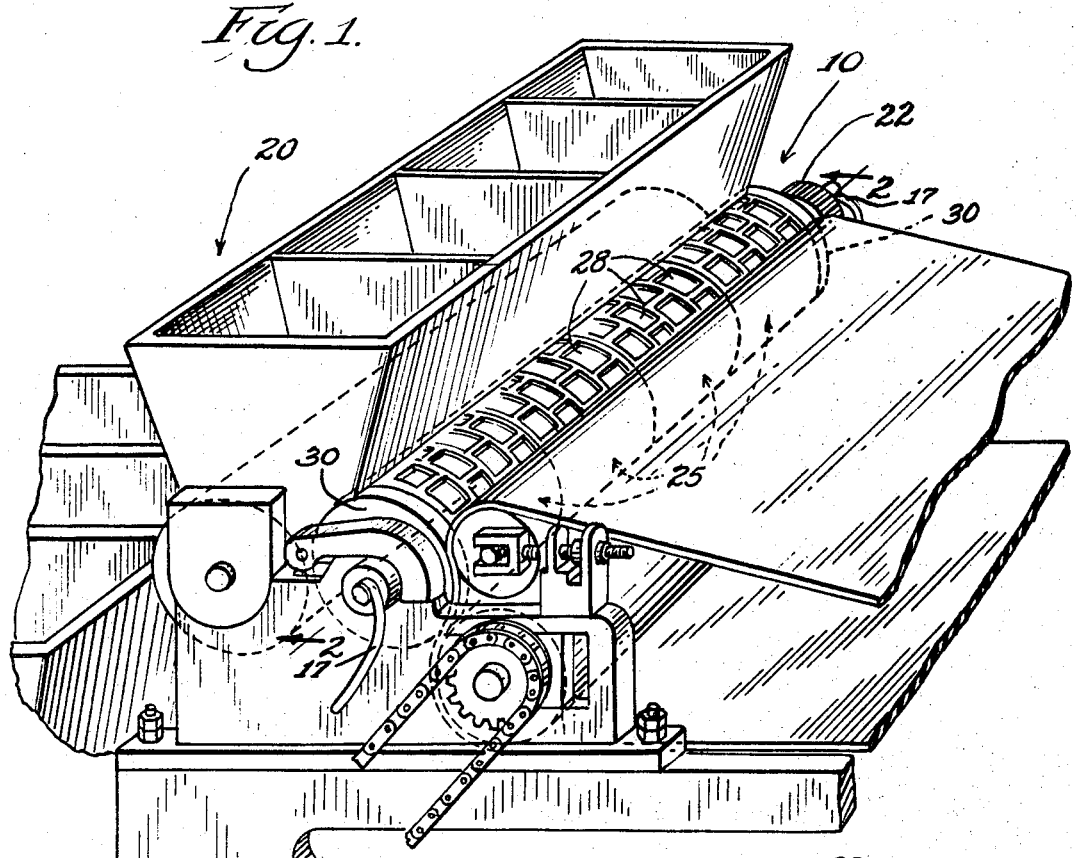
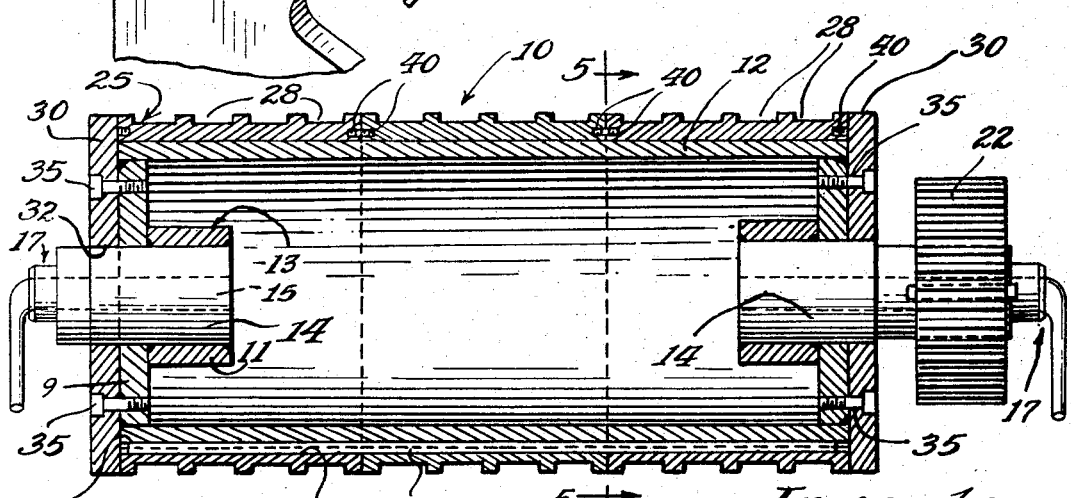
Inventor
Edward A. Weidenmiller
By Mann, Brown & McWilliams
Attys.

Dec. 17, 1968  E. A. WEIDENMILLER  3,416,466
ROTARY COOKIE DIE ROLLS
Filed Aug. 19, 1966  2 Sheets-Sheet 2
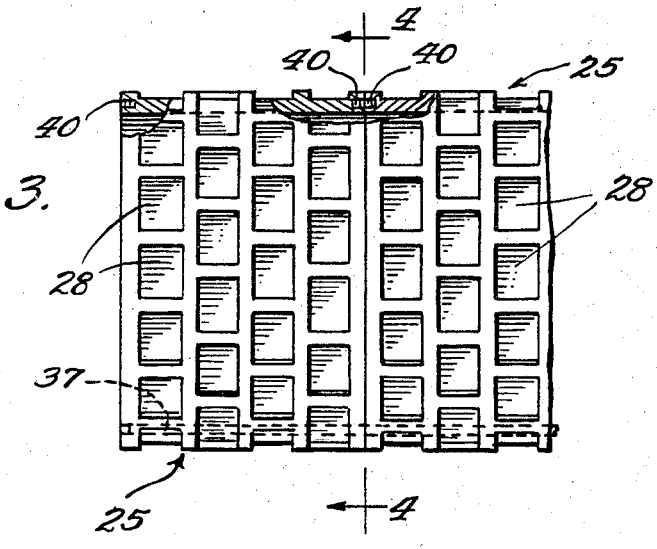
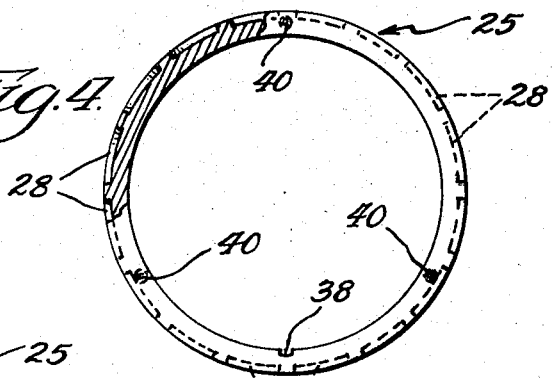
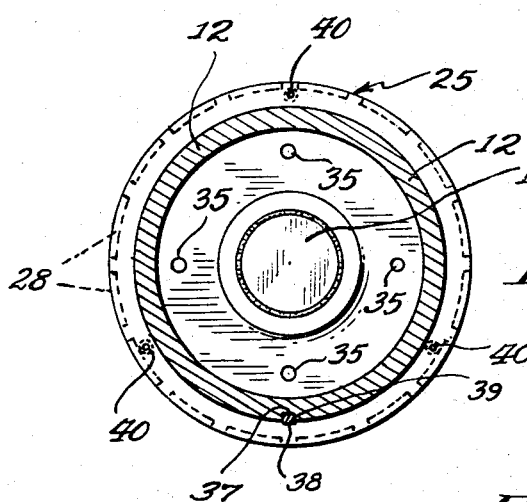
Inventor
Edward A. Weidenmiller
By Mann, Brown & McWilliams
Attys.

United States Patent Office 3,416,466
Patented Dec. 17, 1968

3,416,466
ROTARY COOKIE DIE ROLLS
Edward A. Weidenmiller, 6720 La Porte Ave.,
Lincolnwood, Ill. 60645
Filed Aug. 19, 1966, Ser. No. 573,631
1 Claim. (Cl. 107—8)

ABSTRACT OF THE DISCLOSURE

A die roll for use in forming cookies and the like, wherein the periphery of the die roll is formed in a plurality of readily removable and easily replaced cylindrical sections, each of which is keyed to a cylindrical drum closed by end hubs having extending stub axles about which axis the drum is rotated and with end caps secured to the hub holding the cylindrical sections firmly in place on the drum. Each of the stub axles has a passageway therethrough communicating to the interior of the drum whereby fluids may be circulated to control the temperature of the drum.

---

The present invention relates to the manufacture of cookies and confections by a process which includes forming the cookies or confections on a die roll, and is particularly concerned with improvements in a die roll for forming such cookies and confections.

Individual cookies and confections, and notable among them, individual cookies having designs or patterns thereon, are conveniently formed by compressing the dough into die cavities engraved on a cylinder to preform the dough prior to baking. Such die rolls commonly in use today comprise heavy cylindrical rolls with a plurality of impressions machined on the peripheral surface thereof. Such a roll may be as much as 4 ft. long and 14 inches in diameter, and its surface has literally hundreds of impressions engraved thereon, the exact number, of course, depending upon the size of the roll and the cookie or confection to be formed.

Typically, no seams or other crevices are present which can accumulate dirt, oils and food materials which might become rancid or otherwise spoil. The Food and Drug Administration exercises rigid control over the production of such rolls in order to assure the sanitary integrity of the product which comes in contact with them.

When a manufacturer wishes to make a run of a particular ornamental design, a die roll having that design impression machined on its surface is placed in the mill and dough is fed to it to provide the cookie or confection desired. If any part of the roll, no matter how small, should become damaged for any reason, the entire roll is removed until the damaged portion can be repaired. This usually entails building up of the metal in the damaged area and re-machining the impression in that area. The process is both expensive and time consuming, and since each die roll costs a considerable amount of money, time spent in service and repair represents a substantial investment which is not providing a satisfactory return.

It is an object of the present invention to provide a die roll of improved construction which offers a high degree of versatility in that a basic die roll drum may be "made up" to do a particular job by adding to it, sectional sleeves having a variety of different impression shapes, sizes and decorative appearances. Related to the foregoing, it is an object of the invention to provide an improved die roll which complements the use of a multidough rolling mill such as that disclosed in my copending patent application, Ser. No. 439,890, filed Mar. 15, 1965.

Still another object of the present invention is to provide an improved die roll and sections therefor which permits continuous use of the drum while sections thereof are being repaired, or replaced, thereby eliminating the reworking time otherwise required, and the attendant shutdown time, all of which brings about needless expense.

Still another advantage of the present invention is in its adaptability to controlled cooling brought about by the adaptability of the drum to fluid flow therethrough for controlled temperature of the drum.

These and other objects and advantages of the present invention will become more clear from the following detailed description, taken in conjunction with the drawings, wherein:

FIG. 1 illustrates a sectional die roll of the present invention in conjunction with a multiple dough rolling mill;

FIG. 2 is a section taken vertically through a sectional die roll constructed in accordance with the present invention;

FIG. 3 is an enlarged, partially fragmented view of a pair of sections of the type which are adapted for use with the die roll of the present invention;

FIG. 4 is a section taken along lines 4—4 of FIG. 3; and

FIG. 5 is a sectional view taken along lines 5—5 of FIG. 2.

While the invention is susceptible of various modifications and alternative constructions, certain illustrative embodiments have been shown in the drawing and will be described below in considerable detail. It should be understood, however, that there is no intention to limit the invention to the specific form disclosed, but, on the contrary, the invention is to cover all modifications, alternative constructions and equivalents falling within the spirit and scope of the invention as expressed in the appended claim.

Referring now to the drawings, and particularly to FIG. 2, a sectional die roll 10 is illustrated, being constructed in accordance with the present invention. The die roll comprises a cylindrical core defining a hollow drum 12. The drum size and construction may, of course, be standardized to provide interchangeability. The core is closed and supported on a pair of hubs 13 affixed to either end thereof. The hubs may be welded to the drum or fastened in any other suitable manner, and each is provided with a stub axle 14 protruding therefrom and secured thereto. It is apparent that the hub construction comprises an annular plate 9 having an inwardly extending boss or protrusion 11 secured thereto as by welding or the like. Secured to each of the bosses 11 as by welding is stub axle 14, each having a passageway 15 therethrough and appropriate hose couplings 17 through which fluids may be introduced into the drum 12. The stub axles 14 are in axial alignment with each other, and with the drum 12, and provide an axis upon which the drum might be rotated in a rolling mill of the type, for example, illustrated in FIG. 1 at 20. In that machine, the drum is provided with a drive gear 22 on one of the axles 14, thereby permitting the drum to be rotated either by engagement with a pinion gear or a suitable chain or belt drive. It will be appreciated that any suitable drive may be provided.

In keeping with the invention, a plurality of die impression sections 25 are provided, dismounted ones of which are illustrated in FIGS. 3 and 4. Each die section is of cylindrical construction, and has an inside diameter such that it fits snugly on the drum 12. Each section is of uniform thickness, and a plurality of sections may be spaced, in adjacent relation, on the drum running from end to end. The width of each section may or may not be uniform, depending upon the application of the drum to the machine upon which it is being used. Where a series of sections 25 do not equal the length of the drum, or for other reasons, suitable spacers comprised simply of partial sections having no impressions machined thereon, may be used to complete or otherwise vary the width or working area of the rolls.

As will be seen in FIG. 3, each section is provided with a series of impressions 28 machined on the surface thereof. It is an attribute of the present invention that each section may have different impressions, thereby enhancing the versatility of the device.

Having once mounted the desired series of the sections on the drum 12, end caps 30 are provided, which are formed with a central aperture 32 adapted to fit snugly over the axles 14 and abut against the end of the drum and associated die sections. The end caps or plates may be bolted, as at 35 to the hubs to thereby secure the same tightly against the drum and sections. An elongated key 37 rides in a keyway defined by aligned keyways 38 and 39 between the drum and die sections respectively, to assure perfect alignment at all times. The die sections 25 are so assembled that, when the end caps are in place, they are pressed tightly, one against the other, thereby providing complete accuracy of position with respect to the incoming dough, and the belts which take the molded confections from the die roll itself.

Because of the snug fit of the sections with respect to the drum 12, and with respect to one another, all of which is enhanced by natural vacuum created when the parts are assembled, removal of die sections for repair or replacement is accomplished, in accordance with the present invention, by the provision of a series of tapped holes 40, located in coaxial relation in the side walls of each die section.

It is an additional feature of the present invention that the temperature of the die roll may be accurately controlled in accordance with the requirements of the type of dough being formed. This is brought about, in accordance with the invention, by providing central bores in the axles 14, through which water at a controlled temperature may be circulated to bring about the necessary control of the drum itself. This is particularly important because of the necessity of controlling temperatures for certain types of doughs.

It will now be appreciated that the sectional die roll arrangement of the present invention provides unequalled versatility in its use with a rolling mill, as well as in service and repair operations. Furthermore, the controlled cooling feature permits close control of the manufacturing process which has been more difficult to achieve in the past. The savings in reworking time and costs, as well as the economy of running a short run for experimental or market testing purposes, are readily apparent. All of these features are readily achieved while at the same time providing a construction which is readily cleaned, and easily maintained in a sanitary condition so as to comply with FDA regulations.

I claim as my invention:

1. For use in the manufacture of confections such as cookies and candies from dough, a die roll for forming dough into individual confections, said roll comprising an elongated hollow cylinder, said cylinder being supported on a pair of hubs defining with said cylinder a drum, each of said hubs comprising an annular plate having a laterally extending boss to which is secured an outwardly extending coaxial stub axle about which axis said drum is rotated, each of said stub axles having a passageway therethrough and having a hose coupling by which fluids may be passed to the interior of said drum, a plurality of cylindrical die sections having die cavities formed in the periphery thereof, each being independently and movably mounted with respect to each other on said drum, and end caps secured to said annular plates of said hubs, said caps having portions thereof extending beyond the periphery of said drum for engaging the edges of juxtaposed cylindrical die sections to hold the die sections in closely abutting relation on the drum, the exterior surface of said drum being provided with a keyway, each of said die sections having a tapped hole in the side wall thereof and having a complementary keyway in the interior surface thereof, and a key mounted in said keyways for retaining said die sections in predetermined angular position on said drum.

References Cited

UNITED STATES PATENTS

| | | | |
|---|---|---|---|
| 2,437,202 | 3/1948 | Marino | 107—1 |
| 2,464,301 | 3/1949 | Francis | 156—582 XR |
| 2,586,089 | 2/1952 | Rhodes | 107—12 |
| 2,831,428 | 4/1958 | Dahlberg | 29—117 XR |
| 3,024,112 | 3/1962 | Burgess | 107—50 XR |
| 3,054,163 | 9/1962 | Lakin | 29—125 |

WALTER A. SCHEEL, *Primary Examiner.*

A. O. HENDERSON, *Assistant Examiner.*

U.S. Cl. X.R.

18—21